US011220401B2

(12) United States Patent
Chung

(10) Patent No.: US 11,220,401 B2
(45) Date of Patent: Jan. 11, 2022

(54) CONVEYORIZED BAKING SYSTEM WITH IMPROVED DUST SHIELD SUPPORT

(71) Applicant: AMF AUTOMATION TECHNOLOGIES, LLC, Tucker, GA (US)

(72) Inventor: Chi Chung, Smyrna, GA (US)

(73) Assignee: AMF AUTOMATION TECHNOLOGIES, LLC, Tucker, GA (US)

( * ) Notice: Subject to any disclaimer, the term of this patent is extended or adjusted under 35 U.S.C. 154(b) by 0 days.

(21) Appl. No.: 16/743,398

(22) Filed: Jan. 15, 2020

(65) Prior Publication Data
US 2021/0214165 A1 Jul. 15, 2021

(51) Int. Cl.
| B65G 17/44 | (2006.01) |
| B65G 17/30 | (2006.01) |
| B65G 17/38 | (2006.01) |
| B65G 17/06 | (2006.01) |
| B65G 17/08 | (2006.01) |
| A21B 1/42 | (2006.01) |

(52) U.S. Cl.
CPC ......... B65G 17/062 (2013.01); B65G 17/083 (2013.01); B65G 17/44 (2013.01); A21B 1/42 (2013.01); B65G 2201/0202 (2013.01)

(58) Field of Classification Search
None
See application file for complete search history.

(56) References Cited

U.S. PATENT DOCUMENTS

| 3,440,973 | A | | 4/1969 | Lanham et al. | |
| 3,570,651 | A | * | 3/1971 | Lanham | A21B 1/48 198/778 |
| 4,760,911 | A | * | 8/1988 | Bacigalupe | A21C 13/02 198/474.1 |
| 4,972,941 | A | * | 11/1990 | Kasik | A21C 13/02 198/803.6 |
| 5,147,033 | A | * | 9/1992 | Kasik | A21C 13/02 198/690.1 |
| 5,311,982 | A | * | 5/1994 | Clopton | B65G 17/002 198/779 |
| 7,114,614 | B2 | * | 10/2006 | Hamilton | A21B 1/48 198/803.6 |
| 10,533,634 | B2 | * | 1/2020 | Lavigno, IV | B60B 3/048 |
| 10,550,881 | B2 | * | 2/2020 | Lavigno, IV | F16C 19/10 |
| 2019/0233215 | A1 | * | 8/2019 | Frost | F16G 13/08 |

FOREIGN PATENT DOCUMENTS

| EP | 1975093 A1 | 10/2008 |
| JP | S5360293 U | 5/1978 |

OTHER PUBLICATIONS

AMF Bakery Systems 600-A-003 Standard Hex Grid Spacer (2002).
International Search Report and Written Opinion for PCT/US2021/013145; dated Jun. 28, 2021; 18 pgs.
Invitation to Pay Additional Fees for PCT/US2021/013145; May 4, 2021; 15 pgs.

* cited by examiner

Primary Examiner — Kavel Singh
(74) Attorney, Agent, or Firm — Gardner Groff & Greenwald, PC

(57) ABSTRACT

A conveyorized baking system having improved dust shield support. The system includes including a conveyor track, a conveyor chain that moves through the conveyor track, flanged support struts attached to the conveyor chain, and dust shields supported by the flanged support struts for preventing dust and debris from entering the conveyor track.

37 Claims, 6 Drawing Sheets

CONVEYORIZED BAKING SYSTEM WITH IMPROVED DUST SHIELD SUPPORT

TECHNICAL FIELD

The present invention relates generally to the field of commercial baking systems, and more particularly to a conveyorized baking system with improved support structures for dust shields to prevent debris from entering the conveyor track.

BACKGROUND

Commercial baking systems commonly utilize a conveyor system to move baking pans through baking proofers and ovens. The conveyors systems may include a conveyor track through which a conveyor chain is propelled. Carrier grids for supporting baking pans are typically mounted to the conveyor chain, whereby product within the pans is moved through the baking system along the track. Spacers or grid support posts extend through a slot or channel in the top of the track and attach the carrier grids to the conveyor chain.

To prevent dust and debris from the baking process and surroundings from entering the conveyor track and potentially interfering with system operation or causing excess wear of moving parts, dust shields may be provided between the carrier grids and the conveyor track. Previously known dust shields have included a bent support leg formed by cutting a tab in the body of the dust shield, bending the tab downwardly and supporting the lower end of the bent leg on the conveyor chain with the support leg extending through the slot of the conveyor track.

It has been found that the bent support leg structure of some previously known dust shield components may be prone to failure, particularly in higher-speed, higher-temperature, and/or higher capacity baking systems. Stress failures and bending of the support leg can result in metal-to-metal contact and jamming of the dust shield with the conveyor track, which may cause contamination of the product with metal shavings, interfere with movement of the conveyor chain through the track, and/or increase wear of bearings and other parts. It has also been found that the hexagonal spacers or grid support posts of some previously known conveyor systems may contact the top edge of the conveyor track along the sides of the slot, also potentially contaminating the product, interfering with operation, and/or accelerating wear.

Accordingly, it can be seen that needs exist for improvements to conveyorized baking systems. It is to the provision of a conveyorized baking system with improved support structures for dust shields and improved spacers or grid support posts meeting these and other needs that the present invention is primarily directed.

SUMMARY

In example embodiments, the present invention provides a conveyorized baking system with improved support structures for dust shields and improved spacers or grid support posts. In example embodiments, a flanged support strut having a reduced clearance portion and an outwardly flared support flange is provided to attach the carrier grids to the conveyor chain, and to support the dust shields. The reduced clearance portion provides improved clearance to avoid contact with the top edges of the conveyor track along the sides of the slot. The outwardly flared support flange provides evenly distributed support of the dust shield, eliminating the need for the bent support legs of previously known dust shields. In example embodiments, the configuration of the flanged support strut also serves as an indicator of proper orientation during installation and assembly.

In one aspect, the present invention relates to a conveyorized baking system. The system preferably includes a conveyor track having an open channel extending lengthwise through the interior of the track and a top portion defining a slot opening into the channel. The system preferably also includes a conveyor chain configured for movement through the channel of the conveyor track, the conveyor chain including a plurality of conveyor chain link sections pivotally coupled to one another. The system preferably also includes at least one flanged support strut attached to each of the conveyor chain link sections, each flanged support strut comprising a lower portion configured for attachment to the conveyor chain link section, an upper portion axially opposite the lower portion, and a transversely outward projecting flange. The system preferably also includes at least one carrier for carrying a baking pan configured for attachment to the upper portion of the flanged support strut. The system preferably also includes at least one dust shield configured to be supported by the flange of the at least one flanged support strut between the conveyor track and the at least one carrier.

In another aspect, the invention relates to a dust shield for a conveyorized baking system. The dust shield preferably includes a forward opening and a rear opening. The forward and rear openings are preferably configured to allow passage of an upper portion of a flanged support strut of the baking system. At least one of the forward and rear openings preferably has a dimension configured to prevent passage of a flange portion of the flanged support strut therethrough, whereby the dust shield can be supported by the flanged support strut.

In still another aspect, the invention relates to a flanged support strut for a conveyorized baking system, the flanged support strut including a lower portion comprising a lower coupling configured for attachment to a conveyor chain portion of the baking system, an upper portion axially opposite the lower portion and comprising an upper coupling configured for attachment to a carrier portion of the baking system, and a transversely outwardly projecting flange configured for supporting a dust shield portion of the baking system.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
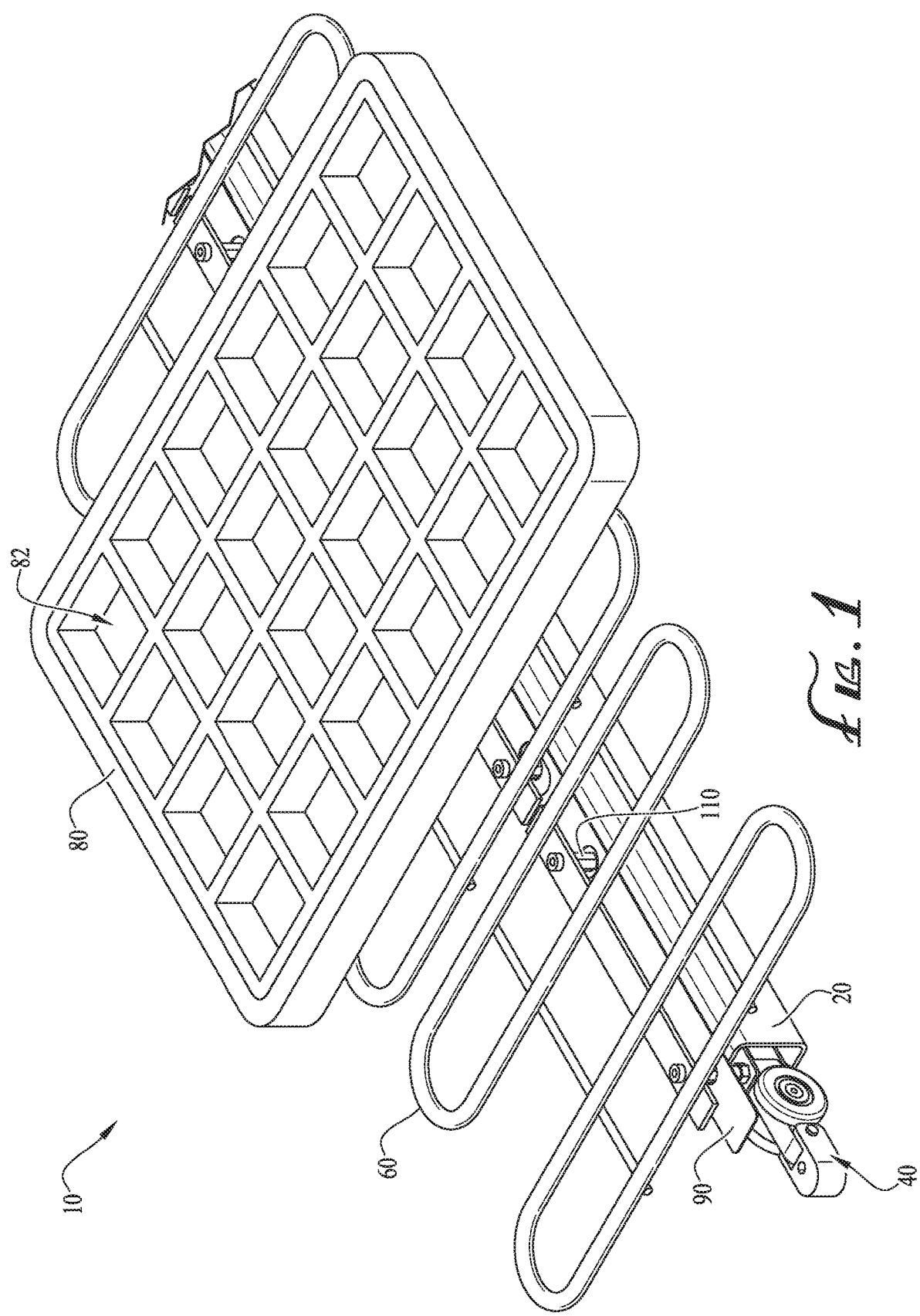
FIG. 1 is a perspective view of a section of a conveyorized baking system according to an example embodiment of the present invention.

With reference now to the drawing figures, wherein like reference numbers represent corresponding parts throughout the several views, FIG. 1 shows a section of a conveyorized baking system 10 according to an example embodiment of the present invention. The system generally comprises a conveyor track 20, a conveyor chain 40 that travels through the track, one or more carrier grids 60 attached to the chain to travel along the track, and one or more baking pans 80 supported by the carrier grids for containing dough or other product for baking. In example embodiments, the conveyor chain 40 is driven by a motorized drive system to move through the track 20 and carry the pans 80 and their contained product through stations or stages of a commercial bakery such as proofers and baking ovens. One or more dust shields or dust covers 90 are attached to the conveyor chain 40 by flanged support struts 110, which also connect the carrier grids 60 to the conveyor chain.

In example embodiments, the conveyor track 20 comprises an elongate extrusion of steel, aluminum, or other metal. The track 20 forms a hollow body having an open channel extending lengthwise therethrough, with internal height and width dimensions configured to receive the conveyor chain 40 and allow the chain to move smoothly through the track. In the depicted embodiment, the track is generally rectangular in cross section, having a bottom, a top, and first and second sides, as shown in greater detail in FIG. 6. The track 20 defines a slot 22 through the top of the track extending along the length of the track, having a slot width configured to provide clearance for the flanged support struts 110 to pass through the slot as the chain 40 moves through the track. In example embodiments, multiple segments of straight and/or curved track 20 are coupled together end-to-end to define a track path through the different stations of the baking system.

Figure 2:
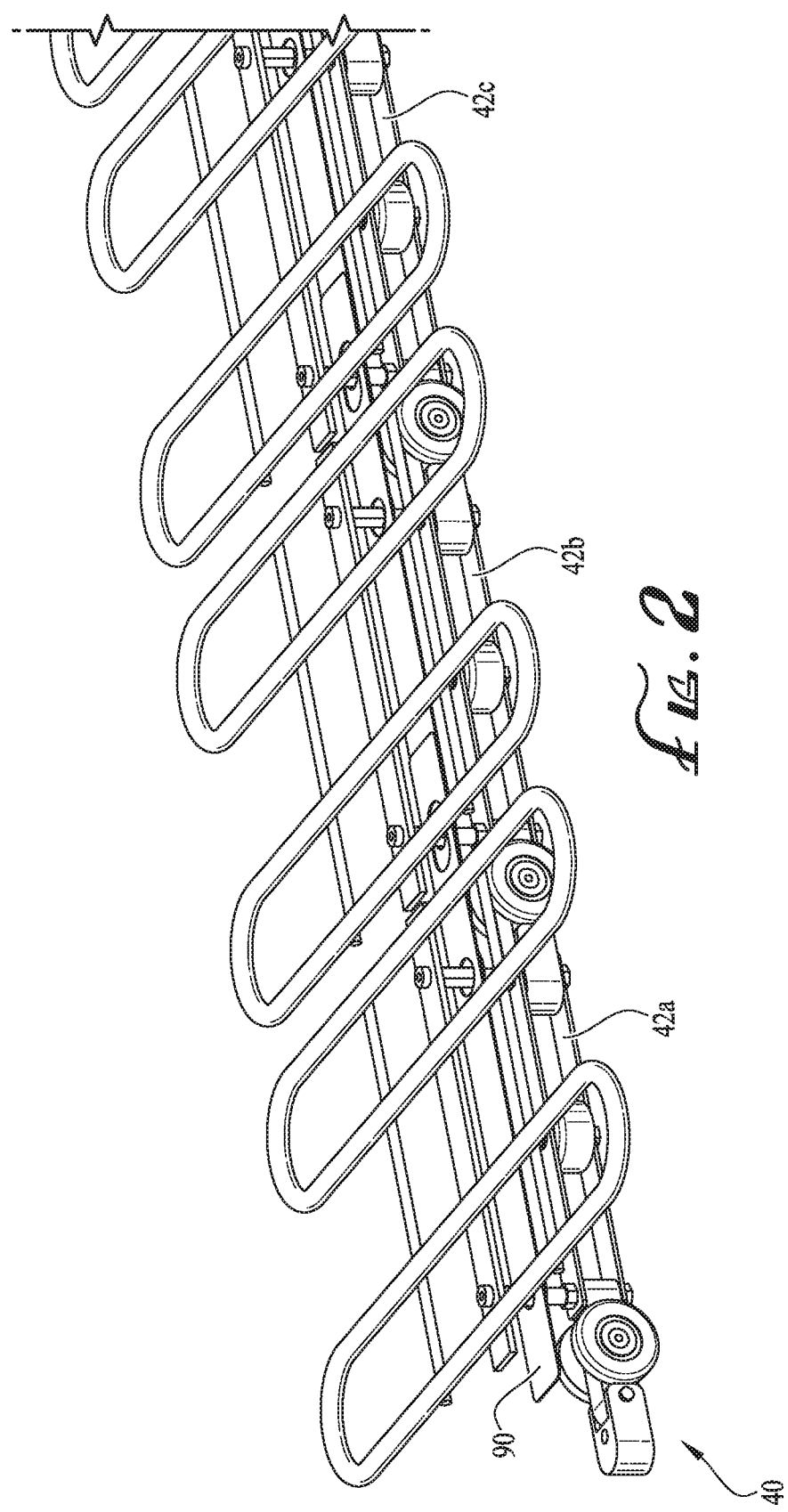
FIG. 2 is a perspective view of the conveyor chain of the conveyorized baking system of FIG. 1, with the conveyor track and baking pans omitted to show additional details.
Figure 3:
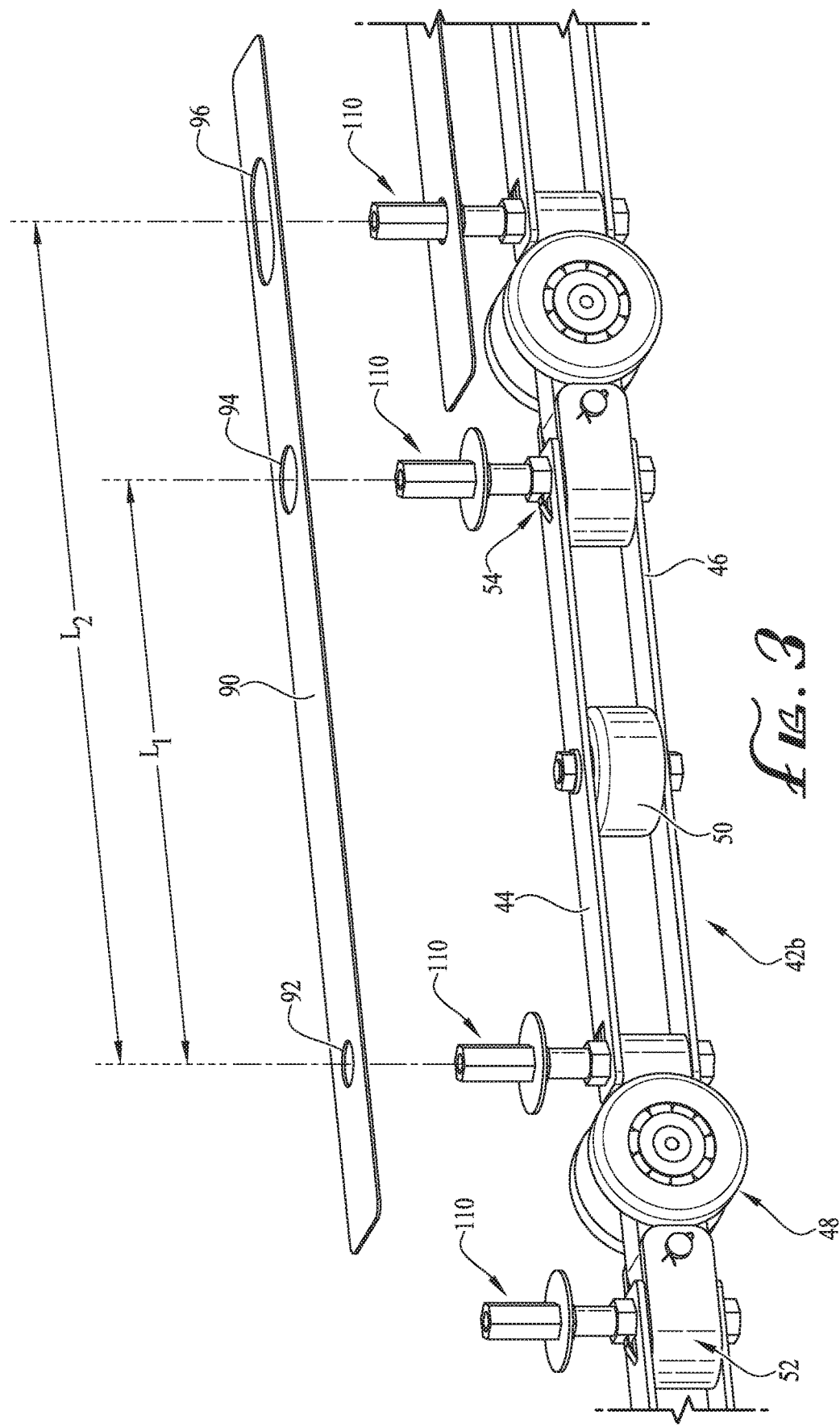
FIG. 3 is a perspective assembly view of the conveyor chain of FIG. 2, with the carrier grids removed to better show flanged support struts according to an example embodiment of the present invention.
Figure 4:
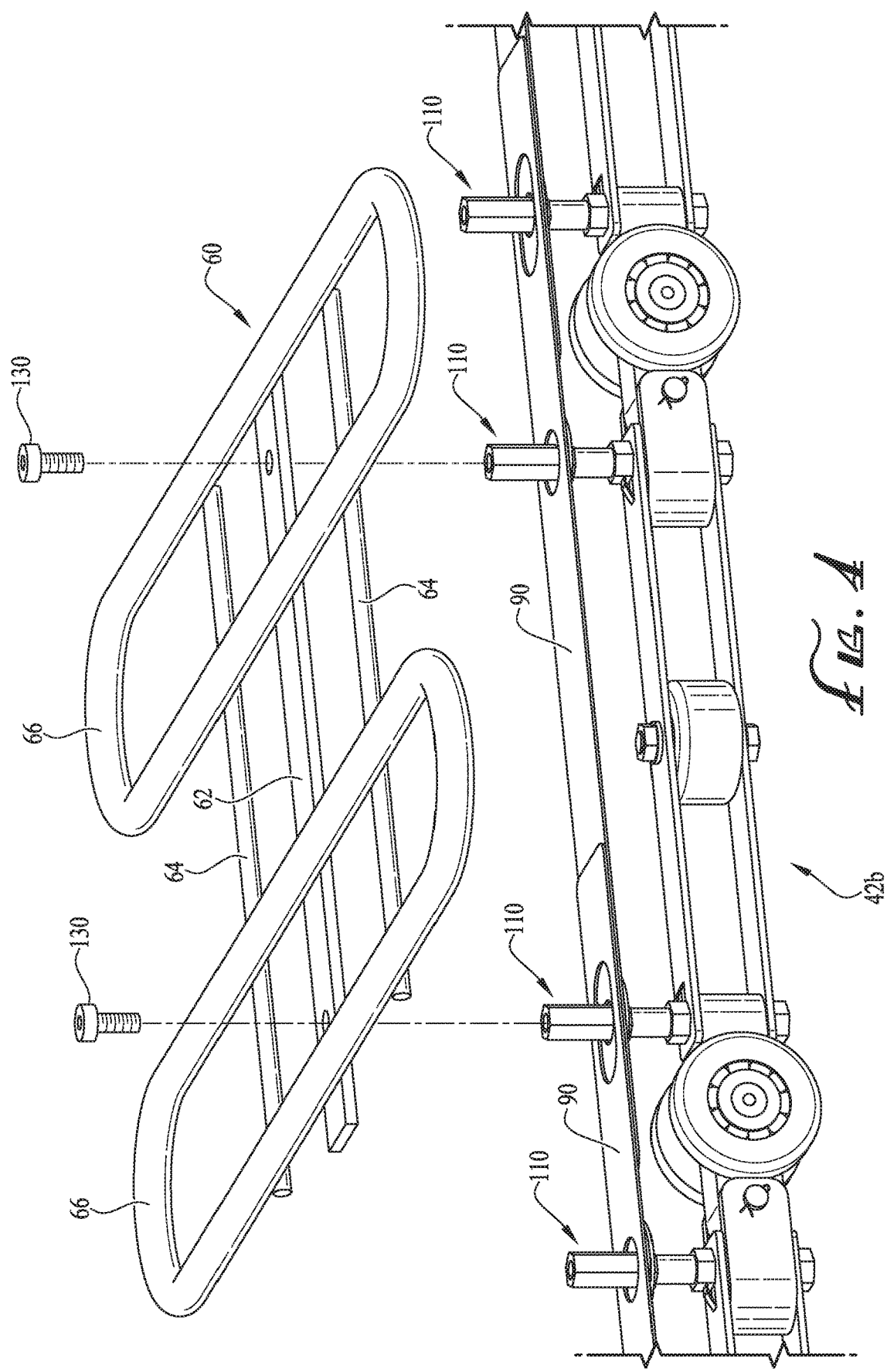
FIG. 4 is a perspective assembly view of the conveyor chain of FIG. 3, with dust shields mounted and showing positioning of the carrier grids for attachment, according to an example embodiment of the present invention.

FIGS. 2-4 show the conveyor chain 40 in greater detail, removed from the track 20. The chain 40 comprises a plurality of linked sections 42 (sections 42a, 42b, 42c being depicted as representative), pivotally connected to one another, forming a flexible assembly capable of traversing through straight and curved portions of the track 20. Each of the chain link sections 42 (section 42b shown as representative in FIGS. 3 and 4) includes a top panel 44, a bottom panel 46, one or more vertical rollers 48, one or more horizontal rollers 50, a front coupling 52, and a rear coupling 54. The vertical and horizontal rollers 48, 50 are rotationally mounted on horizontal and vertical axles respectively and may include bearings or bushings to allow free and smooth rotational movement along the track 20. The front coupling 52 is coupled to the rear coupling of a preceding adjacent linked section, and the rear coupling 54 is coupled to the front coupling of a trailing adjacent linked section. The couplings are preferably pivotal or hinged, allowing both horizontal and vertical pivotal movement between adjacent linked sections, allowing the conveyor chain 40 to smoothly traverse through horizontally and vertically curved sections of the conveyor track 20.

One or more carrier grids 60 are attached to the chain to travel along the track, and one or more baking pans 80 are supported by the carrier grids for containing dough or other product for baking. In example embodiments, the carrier grids 60 may be magnetic, and the pans 80 may incorporate a ferrous or magnetically attracted material to provide magnetic attachment of the pans onto the grids. The pans 80 can be single-loaf, multi-loaf, or other configurations based on the product to be produced, for example including one or more receptacles 82 bounded by sidewalls for receiving dough or other material to be processed. In example embodiments, the grid 60 comprises an attachment panel 62 extending generally longitudinally and in alignment with the conveyor chain 40 along the center of the grid, a pair of outwardly spaced longitudinal supports 64, and one or more (two in the depicted embodiments) support loops 66.

The carrier grids 60 are connected to and supported above the conveyor chain 40 by one or more flanged support struts 110. In example embodiments, one or more flanged support struts 110 are attached to each chain link section 42 of the conveyor chain 40. For example, in the depicted embodiment, a first flanged support strut 110 extends upwardly from the coupling of the front coupling 52 and rear coupling 54 of each adjacent pair of link sections 42 of the conveyor chain 40, and a second flanged support strut 110 is attached to the top panel 44 and extends upwardly from an intermediate location along each of the link sections 42.

Figure 5:
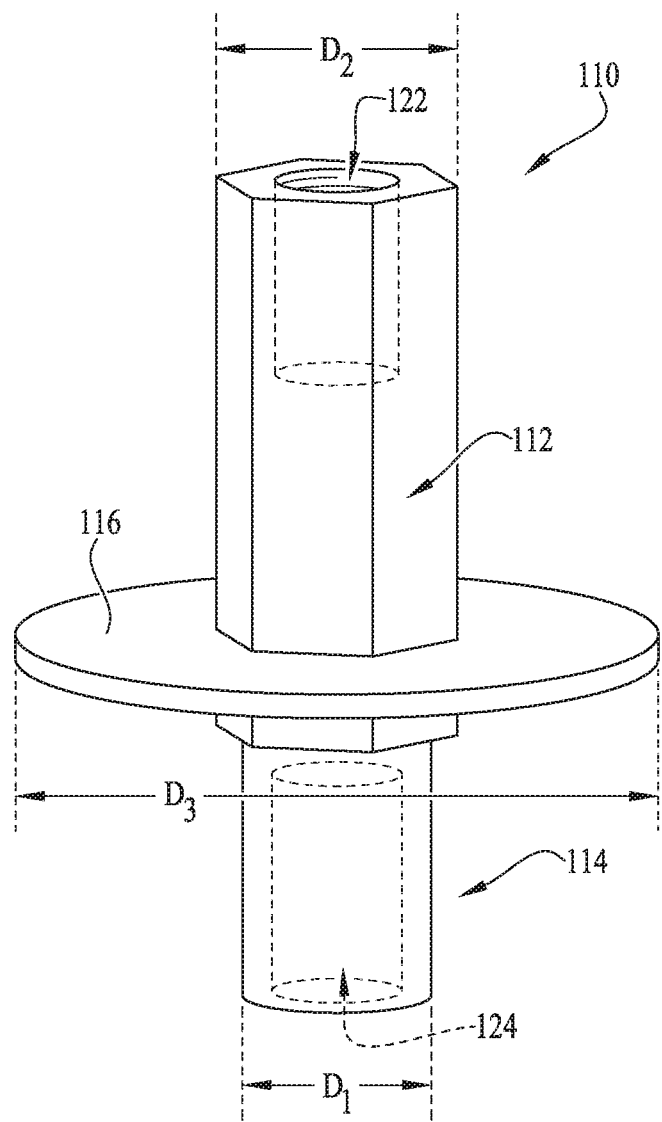
FIG. 5 is a detailed view of a flanged support strut according to an example embodiment of the present invention.
Figure 6:
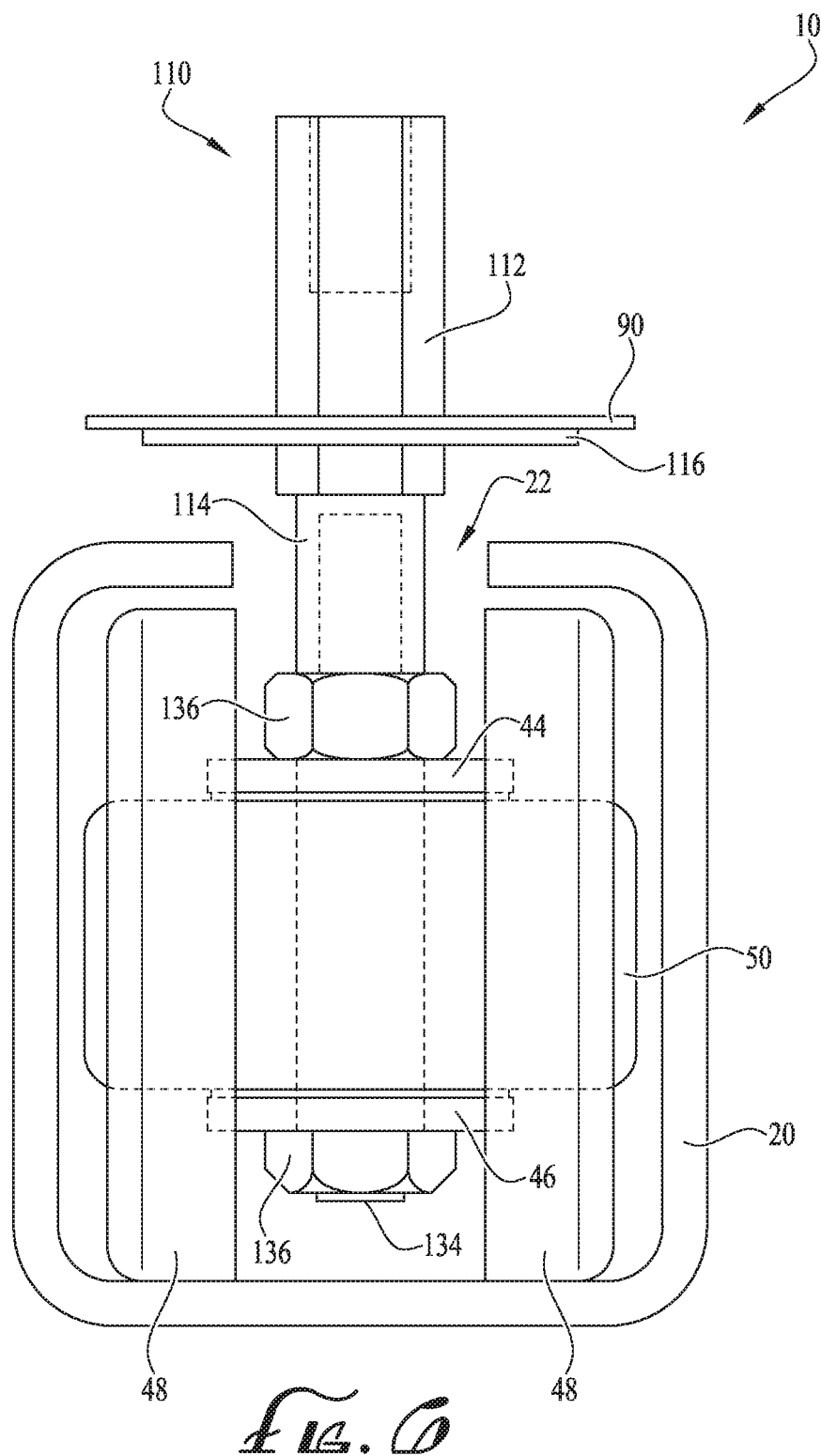
FIG. 6 is a cross-sectional view of a section of a conveyorized baking system showing the flanged support strut attached to the conveyor chain according to an example embodiment of the present invention.

FIGS. 5 and 6 show further detail of a flanged support strut 110 according to an example embodiment of the invention, and its manner of attachment and position within the conveyor system. The flanged support strut 110 includes an axially extending upper portion 112 having a hexagonal or other polygonal cross-sectional profile comprising one or more flats, for example 6 regularly spaced flats having parallel opposed faces allowing engagement with a wrench, socket or other tool. The flanged support strut 110 also includes an axially extending generally cylindrical lower portion 114 having a circular cross-sectional profile. The lower portion 114 has a reduced first diameter or maximum cross-wise minimum dimension $D_1$ that is less than a second cross-wise minimum dimension $D_2$ of the upper portion 112, to provide additional clearance within the slot 22 of the conveyor track 20 when assembled. Also, because the upper portion 112 and lower portion 114 have visibly and tactiley distinct size and shape (e.g., larger hex vs. smaller cylinder), the configuration of the support strut 110 can serve as an indicator of correct orientation of the part during installation, and optionally may assist in automated fabrication. The flanged support strut 110 also includes a transversely projecting flange 116 extending outwardly and generally perpendicular to the axis of the strut. In example embodiments, the transversely projecting flange 116 is generally circular, and extends circumferentially outward around all sides of the hexagonal upper portion 112. In example embodiments, the transversely projecting flange 116 has a minimum transverse dimension $D_3$ that is substantially larger than the maximum second cross-wise dimension $D_2$ of the upper portion 112, for example at least about two times the maximum second cross-wise dimension (i.e., $D_3 \geq 2D_2$). In particular example embodiments, dimension $D_1$ is about 0.4375" (inch), dimension $D_2$ is about 0.5", and dimension $D_3$ is about 1.25". The flanged support strut 110 has an upper coupling for example in the form of a first threaded bore 122 extending axially downward into the top end of the upper portion, and a lower coupling for example in the form of a second threaded bore 124 extending axially upward into the bottom end of the lower portion 114. The first threaded bore of the upper coupling 122 receives a cooperatively engaging threaded bolt or screw 130 that extends through a hole in the attachment panel 62 of grid 60 to secure the grid to the conveyor chain. The second threaded bore of the lower coupling 124 receives the upper end of a cooperatively engaging threaded stud or rod 134, which extends through the top panel 44 and the bottom panel 46 of the conveyor chain 40 and retained in place by bolts 136.

One or more dust covers or dust shields 90 are supported above the conveyor chain 40 by the flanged support struts 110. Each dust cover 90 generally comprises a thin rectangular panel or sheet, for example formed of sheet metal or other substantially rigid material, having one or more openings formed therein. For example, in the depicted embodiment, each dust cover 90 has a generally circular forward opening 92, a generally circular medial opening 94, and an oblong or oval rear opening 96. Alternatively, the medial opening may be omitted, and only forward and rear openings provided. In particular example embodiments, the spacing $L_1$ between the forward opening 92 and the medial opening 94 is about 8", and the spacing $L_2$ between the forward opening 92 and the rear opening 96 is about 12". The dust covers 90 preferably have a length at least equal to the length of the of the link sections 42 of the conveyor chain 40; and more preferably a length greater than (for example about 1.2 to 1.5 times as long) the length of a link section, to allow partial overlapping of adjacent dust covers as shown in FIG. 4. The dust covers 90 preferably have a width of at least the width of the slot 22 in the top of the conveyor track 20, to prevent debris from falling into the slot, and more preferably a width substantially greater than (for example at least about 1.5 to 2 times as wide) the width of the slot. In particular example embodiments, the dust cover 90 has a length of between 14"-17", for example about 15.25", and a width of between 2"-4", for example about 2.75".

At least the forward opening 92, and optionally also the medial opening 94 have a diameter greater than dimension $D_2$ of the upper portion 112 of the flanged support struts 110, but less than dimension $D_3$ of the transversely projecting flanges 116 of the support struts, so that the openings provide clearance for installation of the dust covers over the upper portions of the struts and the transversely projecting flanges provide evenly distributed support of the dust covers all around the support struts. Optionally, the medial opening 94 may be larger than the forward opening 92 for greater clearance and ease of installation. In particular example embodiments, the forward opening 92 has a diameter of about 0.6", and the medial opening 94 has a diameter of about 0.8". Preferably, the forward opening 92 and optionally also the medial opening 94 are installed over support struts 110 mounted to the same conveyor link section 42, and the rear opening 96 is installed over a support strut mounted to the adjacent trailing link section. In this manner, the rear portion of a leading dust cover can overlap and be supported on top of the forward portion of an adjacent trailing dust cover (see FIGS. 3 and 4). The rear opening 96 may be substantially larger than dimension $D_2$ of the upper portion 112 of the flanged support struts 110, and optionally also larger than dimension $D_3$ of the transversely projecting flanges 116 of the support struts, because of the overlapping support provided by the trailing dust cover, to allow additional clearance for pivotal movement between adjacent link sections 42 as the conveyor chain 40 moves through curved portions of the track 20. In particular example embodiments, the rear opening 96 has a length of about 1.7" and a width of about 1.4". In some embodiments, the dust cover optionally also includes a bent support leg adjacent the forward opening 92 formed by cutting a tab in the body of the dust shield and bending the tab downwardly, for retrofit compatibility with systems using bent leg dust cover supports. In alternate embodiments, the bent leg is omitted, and/or there are no openings in the dust cover 90 other than the front, medial and rear openings as described for support by the flanged support struts 110, thereby preventing the possibility of dust or debris passing through an opening in the dust cover.

In example methods of use, support struts 110 are attached to the conveyor chain 40, and the chain is installed in the conveyor track 20. Dust covers 90 are installed over the support struts 110, for example working from a trailing conveyor chain link section 42 forward so that the rear end of each dust cover overlaps and is supported by the front end of the trailing adjacent dust cover. The dust covers are preferably loosely supported by the flanges 116 of the support struts 110 without bolting, but in alternate embodiments may be bolted or otherwise affixed. The carrier grids 60 are then attached to the support struts 110 over the dust covers 90 by bolts 130, with the dust covers loosely retained between the flanges 116 of the support struts 110 and the attachment panel 62 of the carrier grid. Baking pans 80 may then be placed on the carrier grids 60, and dough or other product placed in the receptacle(s) of the baking pans. The conveyor chain is then driven to carry the product in the baking pans 80 along the conveyor path of the track 20 through successive processing stations of a bakery system.

While the invention has been described with reference to example embodiments, it will be understood by those skilled in the art that a variety of modifications, additions and deletions are within the scope of the invention, as defined by the following claims.

What is claimed is:

1. A conveyorized baking system comprising:
   a conveyor track having an open channel extending lengthwise through the interior of the track and a top portion defining a slot opening into the channel;
   a conveyor chain configured for movement through the channel of the conveyor track, the conveyor chain comprising a plurality of conveyor chain link sections pivotally coupled to one another, each conveyor chain link section comprising a top panel, a bottom panel, and at least one roller rotationally mounted between the top panel and the bottom panel;
   at least one flanged support strut attached to each of the conveyor chain link sections, each flanged support strut comprising a lower portion configured for attachment to the conveyor chain link section, an upper portion axially opposite the lower portion, and a transversely outward projecting flange positioned a distance above the top panel;
   at least one carrier for carrying a baking pan configured for attachment to the upper portion of the flanged support strut; and
   at least one dust shield configured to be supported by the flange of the at least one flanged support strut above the top panel and between the conveyor track and the at least one carrier.

2. The conveyorized baking system of claim 1, wherein the at least one dust shield has a width substantially covering the slot of the conveyor track.

3. The conveyorized baking system of claim 1, wherein the lower portion of the support strut has a first crosswise dimension and wherein the upper portion has a second crosswise dimension, and wherein the first crosswise dimension of the lower portion is less than the second crosswise dimension of the upper portion.

4. The conveyorized baking system of claim 1, wherein the lower portion of the support strut has a generally circular cross-sectional profile.

5. The conveyorized baking system of claim 1, wherein the upper portion of the support strut has a generally hexagonal cross-sectional profile.

6. The conveyorized baking system of claim 1, wherein the upper portion and the lower portion are visibly distinct.

7. The conveyorized baking system of claim 1, wherein the flange of the support strut has a transverse dimension that is substantially larger than a cross-wise dimension of the upper portion.

8. The conveyorized baking system of claim 7, wherein the transverse dimension of the flange is at least about two times larger than the cross-wise dimension of the upper portion.

9. The conveyorized baking system of claim 1, wherein the dust shield comprises a forward opening and a rear opening, the forward and rear openings each configured for passage of the upper portion of a respective flanged support strut therethrough.

10. The conveyorized baking system of claim 9, wherein the dust shield further comprises a medial opening between the forward and rear openings, the medial opening also configured for passage of the upper portion of another flanged support strut therethrough.

11. The conveyorized baking system of claim 10, wherein a lengthwise spacing between the forward opening and the medial opening is about 8 inches.

12. The conveyorized baking system of claim 10, wherein the medial opening has a diameter of about 0.8 inches.

13. The conveyorized baking system of claim 9, wherein a lengthwise spacing between the forward opening and the rear opening is about 12 inches.

14. The conveyorized baking system of claim 9, wherein the forward opening has a diameter of about 0.6 inches.

15. The conveyorized baking system of claim 9, wherein the rear opening has a length of about 1.7 inches and a width of about 1.4 inches.

16. The conveyorized baking system of claim 1, wherein the dust shield has a length of between about 14 inches to about 17 inches.

17. The conveyorized baking system of claim 16, wherein the dust shield has a length of about 15.25 inches.

18. The conveyorized baking system of claim 1, wherein the dust shield has a width of between about 2 inches to about 4 inches.

19. The conveyorized baking system of claim 18, wherein the dust shield has a width of about 2.75 inches.

20. The conveyorized baking system of claim 1, wherein the at least one dust shield is loosely supported by the flange of the at least one flanged support strut with a clearance dimension defined between an upper portion of the flanged support strut and an opening in the dust shield.

21. A dust shield for a conveyorized baking system, the dust shield having a forward opening and a rear opening, wherein the forward and rear openings are configured to allow passage of an upper portion of a flanged support strut of the baking system, and wherein at least one of the forward and rear openings has a dimension configured to prevent passage of a flange portion of the flanged support strut therethrough, whereby the dust shield can be loosely supported on top of the flange portion of the flanged support strut with a clearance dimension defined between the upper portions of the flanged support struts and the forward and rear openings.

22. The dust shield of claim 21, wherein a lengthwise spacing between the forward opening and the rear opening is about 12 inches.

23. The dust shield of claim 21, further comprising a medial opening between the forward and rear openings, wherein a lengthwise spacing between the forward opening and the medial opening is about 8 inches.

24. The dust shield of claim 23, wherein the medial opening has a diameter of about 0.8 inches.

25. The dust shield of claim 21, wherein the forward opening has a diameter of about 0.6 inches.

26. The dust shield of claim 21, wherein the rear opening has a length of about 1.7 inches and a width of about 1.4 inches.

27. The dust shield of claim 21, wherein the dust shield has a length of between about 14 inches to about 17 inches.

28. The dust shield of claim 27, wherein the dust shield has a length of about 15.25 inches.

29. The dust shield of claim 21, wherein the dust shield has a width of between about 2 inches to about 4 inches.

30. The dust shield of claim 29, wherein the dust shield has a width of about 2.75 inches.

31. A flanged support strut for a conveyorized baking system, the conveyorized baking system comprising a plurality of conveyor chain link sections pivotally coupled to one another, each conveyor chain link section comprising a top panel, a bottom panel, and at least one roller rotationally mounted between the top panel and the bottom panel, the flanged support strut comprising:
   a lower portion comprising a lower coupling configured for attachment to extend upwardly from the top panel;

an upper portion axially opposite the lower portion and comprising an upper coupling configured for attachment to a carrier portion of the baking system; and a transversely outwardly projecting flange configured for supporting a dust shield portion of the baking system a distance above the top panel.

32. The flanged support strut of claim 31, wherein the lower portion has a first crosswise dimension and wherein the upper portion has a second crosswise dimension, and wherein the first crosswise dimension of the lower portion is less than the second crosswise dimension of the upper portion.

33. The flanged support strut of claim 31, wherein the lower portion has a generally circular cross-sectional profile.

34. The flanged support strut of claim 31, wherein the upper portion has a generally hexagonal cross-sectional profile.

35. The flanged support strut of claim 31, wherein the upper portion and the lower portion are visibly distinct.

36. The flanged support strut of claim 31, wherein the outwardly projecting flange has a transverse dimension that is substantially larger than a cross-wise dimension of the upper portion.

37. The flanged support strut of claim 31, wherein the transverse dimension of the outwardly projecting flange is at least about two times larger than the cross-wise dimension of the upper portion.

* * * * *